Patented Nov. 6, 1951

2,573,678

UNITED STATES PATENT OFFICE 2,573,678

PREPARATION AND PYROLYSIS OF SATURATED ACETALS OF CROTONALDEHYDE

Robert H. Saunders, Oxford, Pa., assignor to Hercules Powder Company, Wilmington, Del., a corporation of Delaware No Drawing. Application December 13, 1947, Serial No. 791,666

7 Claims. (Cl. 260—614)

This invention relates to 1-alkoxybutadienes and to the method for their preparation from crotonaldehyde.

The preparation of 1-alkoxybutadienes from crotonaldehyde has heretofore been accomplished by reacting crotonaldehyde with alcoholic hydrogen chloride to form the acetal of betachlorobutyraldehyde and subsequently heating this acetal with a strong alkali. This process is not entirely satisfactory because of poor yield of products and because of the added cost of hydrogen chloride and sodium hydroxide.

In accordance with the present invention, 1-alkoxybutadienes are produced more economically and in greatly improved yields by condensing crotonaldehyde with an alcohol to form an acetal of crotonaldehyde and subsequently pyrolyzing the acetal.

The condensation of crotonaldehyde with an alcohol to form the acetal of crotonaldehyde is carried out by heating at a temperature between about 80° C. and about 200° C. The water may be removed within this temperature range as an azeotrope with one of the reagents or as an azeotrope with an added water-immiscible liquid boiling within the temperature range of the condensation. The water is preferably removed progressively as the condensation proceeds.

The alcohol which is condensed with the crotonaldehyde should be chosen according to the particular alkoxybutadiene desired since the alkoxy group will have the same number of carbon atoms as the alcohol used. Broadly, any of the saturated aliphatic alcohols having not more than 18 carbon atoms such as methanol, ethanol, stearyl alcohol, etc., may be used in this invention. However, the water-immiscible primary and secondary saturated aliphatic alcohols having from four to eight carbon atoms such as the primary and secondary butyl, amyl, hexyl, heptyl, and octyl alcohols are preferred.

The pyrolysis of crotonaldehyde acetal to produce a 1-alkoxybutadiene may take place at any temperature within the range of about 150° C. and 300° C. Within this range one alkoxide group is split off as alcohol which may be separated, and the 1-alkoxybutadiene may be recovered.

The following examples illustrate the processes of this invention in greater detail but the invention is not restricted to these examples. The parts are by weight.

Example I

A mixture of 148 parts butanol and 140 parts commercial crotonaldehyde was refluxed in a distillation flask with a spiral packed distillation column. An azeotrope containing crotonaldehyde and water distilled at a head temperature of 84° C. The temperature in the pot was about 110° C. The crotonaldehyde was separated from the water in the distillate and returned to the flask. After about four hours' distillation, during which time water was separated from the distillate, the butanol was distilled off and the dibutyl acetal of crotonaldehyde was recovered by distillation in vacuo. The dibutyl acetal of crotonaldehyde boiled at 68° C. (1.0 mm. pressure) and had a refractive index (20° C. D line) 1.4283. The yield was substantially quantitative.

When the above preparation was repeated with crotonaldehyde freed of acid by washing with sodium carbonate and an inert atmosphere was used, the dibutyl acetal was obtained in just as good yield but more time was required for completion of the condensation.

One hundred thirty-seven parts dibutyl acetal of crotonaldehyde was pyrolyzed at 210–220° C. (pot temperature) in a flask having a fractionating column. The heating was so regulated that vapors distilling over did not have a vapor temperature above 175° C. After five hours' heating substantially all of the distillable material had been collected. Polymeric residue not distilled amounted to 12.8 parts. The distillate on redistillation was separated into 1-butoxybutadiene (34.9 parts), butanol and unpyrolyzed acetal which can be treated under pyrolyzing conditions again. The 1-butoxybutadiene boiled at 55.5–58.0° C. (16 mm. pressure) and had a refractive index (20° C. D line) 1.4578. It showed an ultraviolet absorption band at 237 m$\mu$ having an extinction coefficient of 190. On hydrogenation the butoxybutadiene yielded dibutyl ether.

Example II

A mixture of 725 parts $\eta$-hexanol, 175 parts crotonaldehyde, and 435 parts benzene was refluxed in a 10 plate bubble cap fractionating column. The pot temperature was about 110° C. The benzene water azeotrope was slowly distilled off and the excess reagents were then removed in vacuo. The dihexyl acetal of crotonaldehyde distilled at 94–96° C. (0.5 mm. pressure). Its refractive index (25° C. D line) was 1.4366. The yield was substantially quantitative.

The dihexyl acetal of crotonaldehyde was added dropwise to a flask containing alumina pellets heated at 260–290° C. The vapors which distilled from the flask were condensed and redistilled to separate hexyl alcohol from the product. The 1-hexoxybutadiene fraction boiled at 84–93° C. (16 mm. pressure) and had a refractive index (25° C. D line) 1.4590. It showed an ultraviolet absorption band at 237 mµ with an extinction coefficient of 128.

*Example III*

A mixture of 600 parts isopropyl alcohol, 140 parts crotonaldehyde, and 130 parts benzene was refluxed for 72 hours while the water was removed as an azeotrope with benzene. The water was separated from the azeotrope and the organic portion was returned to the system. The diisopropyl acetal of crotonaldehyde was isolated by distillation of the product as a fraction, 95% of which boiled at 63–65° C. (17 mm. pressure) and had a refractive index (25° C. D line) 1.4138.

The diisopropyl acetal of crotonaldehyde when slowly distilled at atmospheric pressure yields an isopropyl alcohol solution of 1-isopropoxybutadiene which shows the ultraviolet absorption band at 237 mµ which is characteristic of the 1-alkoxybutadienes.

While the temperature for acetal formation is not critical and may be anywhere within the range of about 80° C. and about 200° C., the preferred temperature is within the range of about 100° C. and about 130° C.

The water liberated in the reaction to form the acetal is progressively removed in order to shift the equilibrium. The water may be separated by distillation as an azeotrope with the crotonaldehyde, with the alcohol, or with an added azeotropic agent such as benzene, toluene, CCl₄, heptane, and the like, or as a mixed azeotrope. The crotonaldehyde will form a component of the azeotrope in most cases during the early part of the reaction, especially when water-immiscible alcohols are used. The crotonaldehyde is preferably separated from the azeotrope and returned to the reaction. As the reaction progresses, the excess alcohol and even small amounts of the acetal may form part of the azeotrope and they are returned to the reaction. In the case where a higher-boiling alcohol is used as a reagent, it is desirable to have an added lower boiling azeotrope to aid in the removal of the water, especially during the latter stages of the reaction when much of the crotonaldehyde has already undergone reaction.

Usually the amount of alcohol taken for reaction with the crotonaldehyde will be in excess of that theoretically required. Moreover, a large excess of alcohol over that required for the reaction may be used. However, there is generally no advantage in using more than about 10 moles alcohol per mole crotonaldehyde. A 4 to 8 mole excess of alcohol is preferred when the alcohol removed along with the water is returned continuously to the system.

Catalysts which have heretofore been used in the condensation of crotonaldehyde with alcohols have led to products other than the acetal of crotonaldehyde. For example, when hydrogen chloride has been used as the catalyst, the product has been the acetal of either chlorobutyraldehyde or alkoxybutyraldehyde depending on whether an equimolecular amount or a catalytic amount of hydrogen chloride was used. Such products are avoided in the present invention by effecting the condensation in the absence of any catalyst, such as inorganic catalysts, which favor these other products. Organic carboxylic acids normally present in the reagents, crotonic acid, for example, may have a mild catalytic effect for the formation of the acetals of crotonaldehyde but not for the addition of the alcohol to the double bond. Acids of this type, however, are not effective catalysts because they combine with the alcohol much more rapidly than the crotonaldehyde in the process of this invention, and any catalytic effect is fleeting. Therefore, carboxylic acids are not classified as catalysts within the scope of this invention and may be present in amounts normally present in the reagents.

The acetals may be distilled or otherwise purified, if desired, or they may be used directly without further purification for the pyrolysis step. For example, the excess alcohol and crotonaldehyde, if any be present, may be distilled from the crotonaldehyde acetal and the temperature may be raised to the pyrolysis range for the second step in the process. Although the acetal may be formed at a temperature within the range of about 150° C. to about 200° C. which is within the pyrolysis temperature range, the presence of alcohol required for acetal formation suppresses the pyrolysis reaction thus allowing only small amounts of alkoxybutadiene to form.

The pyrolysis reaction may be carried out at any temperature within the range 150° C. to 300° C. It is usually carried out by heating the crotonaldehyde acetal within this range and separating by their higher volatility the products of the reaction as they form. The separation may suitably be effected by any of the usual fractionating columns or fractionating condensers. In such a process the entire charge of crotonaldehyde acetal may be heated at once or the acetal may be added gradually to the pyrolysis vessel. The pyrolysis may likewise be effected by pyrolyzing and then fractionally distilling to separate the products from starting material. In such a case pyrolysis is incomplete due to the equilibrium set up under conditions of pyrolysis without removing the alcohol formed. The recovered starting material may be subjected to pyrolysis conditions again. In any of these variations of pyrolysis, it is preferable to effect the pyrolysis under conditions wherein the 1-alkoxybutadiene is subjected to temperatures within the pyrolysis range for as short a time as possible to avoid unnecessary polymerization. If desired, reduced pressure may be used during the pyrolysis to remove the pyrolysis products. The preferred pyrolysis temperature is within the range of about 170° C. and 270° C.

Catalysts are not required for the pyrolysis. However, catalysts such as silica gel, metal acid sulfates, metal metaphosphates, acid clays, magnesium aluminum silicates, and the like may be used. When catalysts are used, a decrease of the temperature and contact time with careful control thereof during the pyrolysis is required for best results. Moreover, the alkoxybutadiene produced in the pyrolysis must be removed from prolonged contact with the catalyst to minimize polymerization. Because of ease of control, non-catalytic pyrolysis is preferred.

The pyrolysis reaction involved in this invention is an equilibrium reaction which is shifted to completion by removal of one of the products. Usually the alcohol liberated in the pyrolysis, being lower boiling than the 1-alkoxybutadiene, is progressively removed by distillation. On the other hand, the 1-alkoxybutadiene may be progressively removed by condensation or polymerization with other reagents such as a maleic ester, for example. If the 1-alkoxybutadiene is to be recovered, however, the alcohol is preferably distilled off as the pyrolysis reaction proceeds.

The 1-alkoxybutadienes produced by the process of this invention are valuable intermediates for modified rubbery polymers. They form especially valuable copolymers by copolymerization with styrene, methyl vinyl ketone, methyl methacrylate, and the like. They are also highly useful intermediates for the production of plasticizers by condensation with maleic esters.

In accordance with this invention, it is seen that there is thus provided a method of producing crotonaldehyde acetals and a method for producing 1-alkoxybutadienes therefrom, each of which methods constitutes a novel, simple and economical process and there is also provided by the combination of the two methods a novel, simple, and economical process for producing the 1-alkoxybutadienes from crotonaldehyde without creating useless by-products of the prior art processes.

What I claim and desire to protect by Letters Patent is:

1. In the process of producing a 1-alkoxybutadiene from crotonaldehyde by condensing crotonaldehyde with a saturated aliphatic monohydric alcohol and pyrolyzing the crotonaldehyde acetal so formed, the step of preparing the crotonaldehyde acetal by heating crotonaldehyde with a saturated aliphatic monohydric alcohol at a temperature within the range of about 80° C. and about 200° C., in the absence of a catalyst, while progressively distilling off the water evolved.

2. In the process of producing a 1-alkoxybutadiene from crotonaldehyde by condensing crotonaldehyde with a saturated aliphatic monohydric alcohol and pyrolyzing the crotonaldehyde acetal so formed, the step of preparing the crotonaldehyde acetal by heating crotonaldehyde with a saturated aliphatic monohydric alcohol at a temperature within the range of about 100° C. and about 130° C., in the absence of a catalyst, while progressively distilling off the water evolved.

3. In the process of producing a 1-alkoxybutadiene from crotonaldehyde by condensing crotonaldehyde with a saturated aliphatic monohydric alcohol and pyrolyzing the crotonaldehyde acetal so formed, the step of preparing the crotonaldehyde acetal by heating crotonaldehyde with a saturated aliphatic monohydric alcohol at a temperature within the range of about 80° C. and about 200° C., in the absence of a catalyst, while progressively distilling off the water evolved as a constant boiling mixture with one of the components of the reaction mixture.

4. In the process of producing a 1-alkoxybutadiene from crotonaldehyde by condensing crotonaldehyde with a saturated aliphatic monohydric alcohol and pyrolyzing the crotonaldehyde acetal so formed, the step of preparing the crotonaldehyde acetal by heating crotonaldehyde with a saturated aliphatic monohydric alcohol at a temperature within the range of about 100° C. and about 130° C., in the absence of a catalyst, while progressively distilling off the water evolved as a constant boiling mixture with one of the components of the reaction mixture.

5. In the process of producing a 1-alkoxybutadiene from crotonaldehyde by condensing crotonaldehyde with a saturated aliphatic monohydric alcohol and pyrolyzing the crotonaldehyde acetal so formed, the step of preparing the crotonaldehyde acetal by heating crotonaldehyde with a saturated aliphatic monohydric alcohol and an inert volatile water-immiscible liquid at a temperature within the range of about 80° C. and about 200° C., in the absence of a catalyst, while progressively distilling off the water evolved as an azeotrope with said water-immiscible liquid.

6. In the process of producing a 1-alkoxybutadiene from crotonaldehyde by condensing crotonaldehyde with a saturated aliphatic monohydric alcohol and pyrolyzing the crotonaldehyde acetal so formed, the step of preparing the crotonaldehyde acetal by heating crotonaldehyde with a saturated aliphatic monohydric alcohol and an inert volatile water-immiscible liquid at a temperature within the range of about 100° C. and about 130° C., in the absence of a catalyst, while progressively distilling off the water evolved as an azeotrope with said water-immiscible liquid.

7. The process of preparing a 1-alkoxybutadiene which comprises the steps of heating crotonaldehyde with a saturated aliphatic monohydric alcohol in the absence of a catalyst at a temperature within the range of about 80° C. and about 200° C. and, without isolating the crotonaldehyde acetal so formed, continuing to heat the reaction mixture to a temperature within the range of about 150° C. and about 300° C., the water and alcohol being progressively distilled off as they are evolved in the process.

ROBERT H. SAUNDERS.

REFERENCES CITED

The following references are of record in the file of this patent:

UNITED STATES PATENTS

| Number | Name | Date |
| --- | --- | --- |
| 1,931,858 | Bauer | Oct. 24, 1933 |
| 2,124,686 | Carothers | July 26, 1938 |
| 2,189,529 | Carothers | Feb. 6, 1940 |

OTHER REFERENCES

Dupire "Chem. Abstracts," vol. 37, page 3737. Abstracts of article in "Compts. Rendus," vol. 214 (1942), pages 359–360.

Faucett, "Paint, Oil & Chemical Review," June 8, 1939, pages 9–11.

Buttline, "Paint, Oil & Chemical Review," May 6, 1943, page 15.

Beilstein, "Handbuch der Organischen Chemie," vol. 1, supplement, page 108.